(12) United States Patent
Gilman et al.

(10) Patent No.: US 7,425,381 B2
(45) Date of Patent: Sep. 16, 2008

(54) HIGH TEMPERATURE SEAL

(75) Inventors: John Gilman, Corvallis, OR (US); Daniel A Kearl, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1117 days.

(21) Appl. No.: 10/341,617

(22) Filed: Jan. 13, 2003

(65) Prior Publication Data
US 2004/0137302 A1 Jul. 15, 2004

(51) Int. Cl.
*H01M 2/08* (2006.01)
(52) U.S. Cl. ............................................. 429/35
(58) Field of Classification Search .................. 429/12, 429/13, 34–39
See application file for complete search history.

(56) References Cited
U.S. PATENT DOCUMENTS

| 4,028,324 | A | | 6/1977 | Tuschner et al. | |
|---|---|---|---|---|---|
| 4,212,929 | A | * | 7/1980 | Grevstad et al. | .............. 429/37 |
| 4,761,349 | A | * | 8/1988 | McPheeters et al. | .......... 429/39 |
| 5,179,047 | A | | 1/1993 | Chiba | |
| 5,863,969 | A | | 1/1999 | Ward et al. | |
| 5,949,071 | A | | 9/1999 | Ruffner et al. | |
| 6,010,798 | A | | 1/2000 | Hammerschmidt et al. | |
| 6,074,771 | A | * | 6/2000 | Cubukcu et al. | .............. 429/30 |
| 6,211,561 | B1 | | 4/2001 | Zhao | |
| 2003/0176277 | A1 | | 9/2003 | Suh et al. | |

FOREIGN PATENT DOCUMENTS

| EP | 0982274 | 3/2000 |
|---|---|---|
| EP | 1010675 | 6/2000 |
| WO | WO9306044 | 4/1993 |

OTHER PUBLICATIONS

Lawrence W. Hrubesh: "Aerogel Applications" Journal of Non-Crystalline Solids 225 (1998) pp. 335-342.
J. Fricke et al: "Aerogels: production, characterization, and applications" Thin Solid Films 297 (1997) pp. 212-223.
S. Rouanet et al: "Aerogels for Optimized Performance in Vacuum Insulation Panels" 46th International Sampe Symposium May 6-10, 2001 pp. 1263-1270.
Fricke et al: "Aerogels—Preparation, Properties, and Applications-"Structure and Bonding, Berlin, ED vol. 77, 1992, pp. 38-87.

* cited by examiner

*Primary Examiner*—Patrick Ryan
*Assistant Examiner*—K. Walker

(57) ABSTRACT

A high temperature seal including an aerogel gasket disposed between two or more components of a high temperature fuel cell system.

13 Claims, 5 Drawing Sheets

HIGH TEMPERATURE SEAL

BACKGROUND

Fuel cells have gained in popularity and sophistication in recent years. Fuel cells conduct an electrochemical reaction of with oxygen and a fuel to produce electricity and heat. Fuel cells are similar to batteries, but they can be "recharged" while providing power, and usually operate much more cleanly than conventional hydrocarbon combustion.

Fuel cells provide a DC (direct current) voltage that may be used to power motors, lights, computers, or any number of electrical appliances. There are several different types of fuel cells, each using a different chemistry. Fuel cells are usually classified by the type of electrolyte used. The fuel cell types are generally categorized into one of five groups: proton exchange membrane (PEM) fuel cells, alkaline fuel cells (AFC), phosphoric-acid fuel cells (PAFC), solid oxide fuel cells (SOFC), and molten carbonate fuel cells (MCFC).

Many fuel cells use hydrogen as their fuel. This facilitates clean and effective electricity production with water as the only theoretical by-product. However, hydrogen is often difficult and costly to produce and store. Therefore, SOFCs are a particularly promising fuel cell type because they do not require a pure hydrogen source for fuel. While SOFCs are operable with hydrogen, they may also use a variety of other fuels. SOFCs often operate on fuels that are less expensive and more readily available than hydrogen, such as hydrocarbons and alcohols.

Nevertheless, several challenges remain in the development of commercially viable solid oxide fuel cells for powering consumer electronics. SOFCs operate in a temperature range (400-1000° C.) that precludes sealing materials such as rubber or plastic from being used between the various fuel cell system components.

Consequently, seals for various SOFC system components have been made of mica, glass, or glass ceramics. These seals are used to prevent leaks of fuel and by-products from the fuel cell system, even at high operating temperatures.

However, mica has very limited compliance characteristics, which often result in a poor seal. Glass is even less compliant than mica, which often results in cracked seals and/or damaged fuel cell system components.

Additionally, the differences in the coefficients of thermal expansion between the seals and the fuel cell system components make it very difficult to create and maintain effective seals in solid oxide and other high-temperature fuel cell applications. Again, this is due to the high operating temperatures of the fuel cell system

SUMMARY

In one of many possible embodiments, a high temperature seal including an aerogel gasket is disposed between two or more components of a high temperature fuel cell system.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION OF THE ILLUSTRATED EMBODIMENTS

High temperature fuel cells, such as solid oxide fuel cells and molten carbonate fuel cells, operate at temperatures ranging between approximately 400 and 1000° C. Therefore, the term "high temperature" as used herein indicates temperatures in the range of about 400-1000° C. As mentioned in the background, seals at interfaces between various components of high temperature fuel cell systems are difficult to create and maintain at best, and in many cases sealed interfaces between high temperature fuel cell systems leak uncontrollably. Therefore, the following will describe, among other things, more reliable seals for high temperature fuel cell applications.

Figure 1:
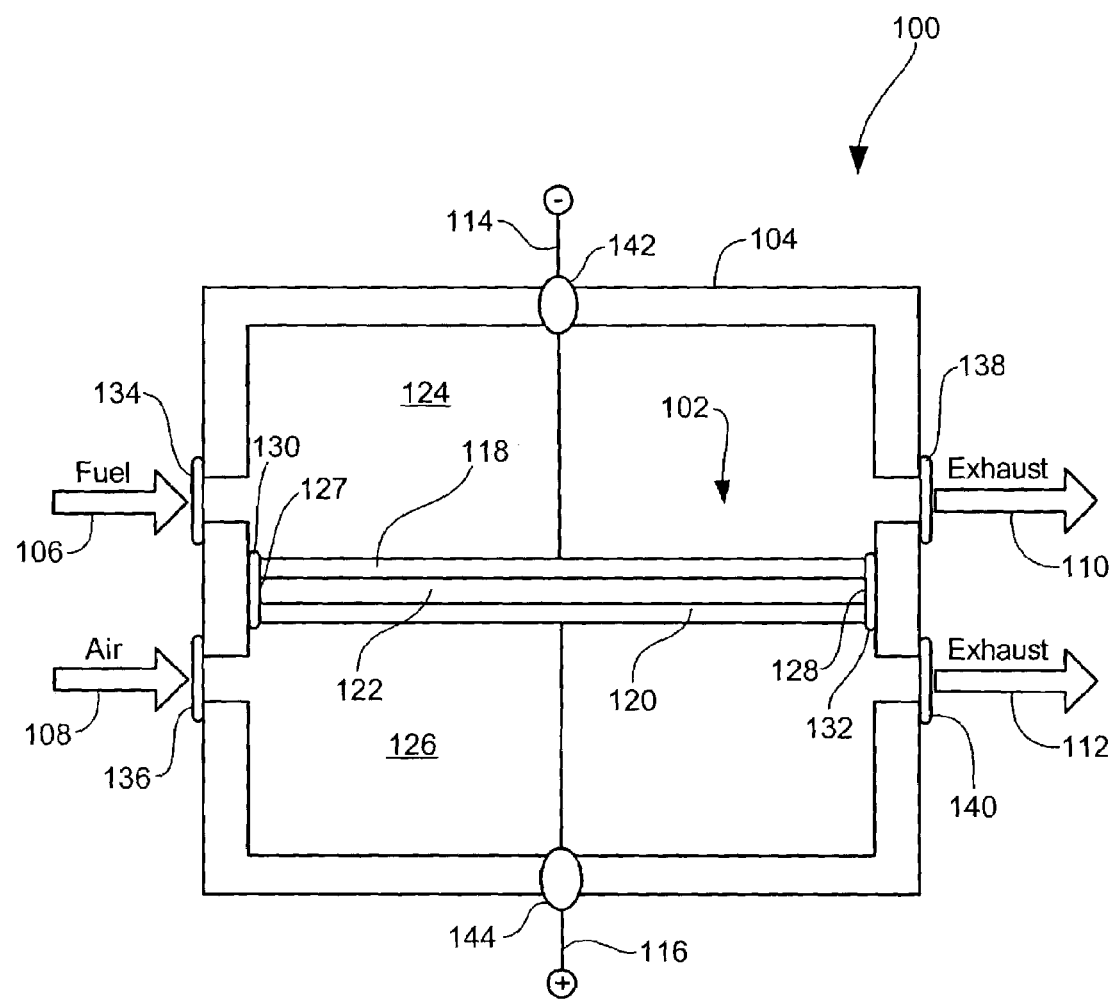
FIG. 1 is a generic high temperature fuel cell system with which embodiments of the present invention may be used.

Turning to the figures, and in particular to FIG. 1, a generic high temperature fuel cell system (100) is shown illustrating some of the important interfaces between various system components. The high temperature fuel cell system (100) of the present embodiment includes a fuel cell (102). The fuel cell (102) may also represent a fuel cell stack. Single fuel cells normally produce only a very small voltage (~0.7V). Therefore, fuel cells are often stacked to increase the voltage produced and, consequently, the usable current.

Other components of the high temperature fuel cell system (100) may include, but are not limited to: a housing (104), a fuel supply line or manifold (106), an oxygen or air supply or manifold (108), a first exhaust path or manifold (110) for the fuel, and a second exhaust path or manifold (112) for the oxygen or air. It will be understood, however, that some embodiments may include only a single exhaust path or manifold (110) instead of the two shown in FIG. 1. The system (100) also includes electrical connections such as the negative and positive electrical connections (114 and 116, respectively). These connections can be used to connect the fuel cell in an electrical circuit and provide generated power to electrical or electronic devices.

The fuel cell (102) is contained by the housing (104). The fuel cell (102) may be a solid oxide fuel cell, a molten carbonate fuel cell, or other high temperature fuel cell. The fuel cell (102) includes three basic fuel cell components: an anode (118), a cathode (120), and an electrolyte (122) disposed between the anode (118) and the cathode (120). There may also be catalysts at both the anode (118) and cathode (120) to facilitate the fuel cell system's (100) electrochemical reaction.

The fuel cell (102) of the present embodiment divides the housing (104) into at least two portions. According to the present embodiment, the housing is divided into an anode chamber (124) and a cathode chamber (126). However, any number of other chambers may also be created in the housing (104).

The high temperature fuel cell system (100) includes many interfaces between system components, one or more of which may use seals or gaskets to prevent leakage. For example, in the embodiment shown, there are first and second interfaces (127 and 128, respectively) between the fuel cell (102) and the housing (104). There may also be additional interfaces where a seal may be useful including, but not limited: interfaces between the fuel supply (106) and the housing (104), between the oxygen supply (108) and the housing (104), between the exhaust paths (110 and 112) and the housing (104), and between the electrical interconnections (114 and 116) and the housing (104) as shown. In addition, any number of other interfaces between high temperature fuel cell system components may also be considered for sealing.

For the high temperature fuel cell system (100) shown and others, it may be desired to adequately seal one or more interfaces (127, etc.) between various components. Of particular importance may be the seal between the housing (104) and the fuel cell (102). Therefore, a first seal or gasket (130) is shown disposed between the fuel cell (102) and the housing (104).

The first seal (130) and/or a similar or identical second seal (132) isolates fuel in the anode chamber (124) from intermingling with oxygen in the cathode chamber (126). These seals (130 and 132) also prevent venting to the atmosphere of any reactants, products, or other materials that may be at high temperatures.

In many high temperature fuel cell systems such as the system (100) shown in FIG. 1, the housing (104) is made of stainless steel or other structural materials, and the fuel cell (102) includes ceramic or other materials. The interfaces (127 and 128) between the stainless steel housing and the ceramic fuel cell components are very difficult to maintain in high temperature conditions. However, it has been discovered that gaskets made of an aerogel can provide the desired seal between fuel cell system components.

Aerogels are advanced compliant materials of extremely low density that are also resistant to high temperatures. Aerogels are heat resistant to temperatures of up to 1400° C. Usually more than 96 percent of an aerogel volume is air, with the remaining portion containing a wispy matrix of silica (silicon dioxide). Some aerogels are up to 99.9 percent air by volume and only 0.1 percent silica. As used herein, a low-density material is a material that is 90 percent or more air or empty space by volume. Aerogels and aerogel sheets are commercially available from a variety of sources. The term "aerogel" as used herein includes any product using an aerogel as a primary or secondary constituent. The aerogel gaskets (130 and 132) are preferably made of silicon based aerogels.

Aerogels are typically porous and transparent. Therefore, according to some embodiments, the aerogels may be pulverized and reconstituted to reduce or eliminate permeability for high temperature fuel cell sealing applications. Alternatively or additionally, the aerogels may be covered by a skin (e.g. a gas-impermeable skin) to reduce permeability prior to use in a high temperature fuel cell.

In addition to the aerogel gaskets (130 and 132) shown between the housing (104) and the fuel cell (102), any number of additional seals or gaskets made of aerogel may also be used between other fuel cell system (100) components. According to the embodiment of FIG. 1, there is a third aerogel seal (134) at the interface between the fuel supply (106) and the housing (104), a fourth aerogel seal (136) between the oxygen supply (108) and the housing (104), fifth and sixth aerogel seals (138 and 140) between the exhaust paths (110 and 112) and the housing (104), and sixth and seventh aerogel seals (142 and 144) between the electrical interconnections (114 and 116) and the housing (104). In addition, any number of other aerogel seals or gaskets between high temperature fuel cell system components may also be used according to particular needs.

Again, the seals shown are exemplary and not limited to the specific components and interfaces specifically referenced. Further, it is not necessary that the high temperature fuel cell system (100) have every one of the aerogel seals as shown, there may be a few as one aerogel seal between any two high temperature system components in some embodiments.

Each of the aerogel gaskets or seals described above may be made by stamping or cutting an aerogel sheet into any desired configuration. According to one embodiment, an aerogel sheet is cut to form gaskets by a water jet. However, any other forming, casting, stamping, or cutting method may also be used. Several examples of the configurations that may be useful for high temperature fuel cell system seals are discussed below with reference to the figures.

Figure 2A:
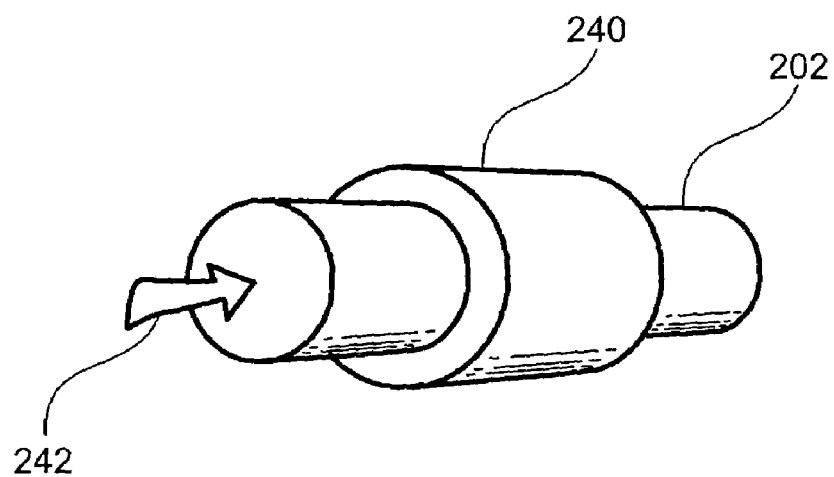
FIG. 2a is a perspective view of an annular aerogel seal for use in a high temperature fuel cell system according to one embodiment of the present invention.
Figure 2B:
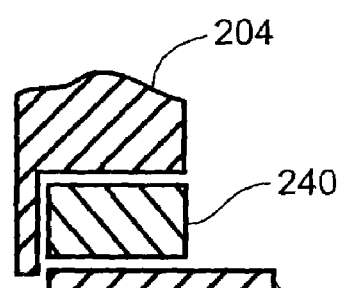
FIG. 2b is a cross-sectional view of the annular aerogel seal of FIG. 2a in relation to a housing.
Figure 2B:
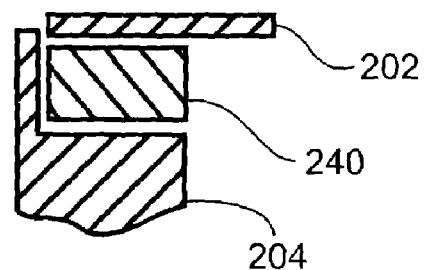

Referring to FIGS. 2a and 2b, an annular seal or gasket (240) is shown. The annular seal (240) is an aerogel gasket arranged about a fuel cell, for example a tubular solid oxide fuel cell (202). The tubular solid oxide fuel cell (202) may receive fuel via an internal passageway (242). As shown in FIG. 2b, the annular seal (240) may be sandwiched between a housing (204) and the tubular solid oxide fuel cell (202). The annular seal (240) made with aerogel is flexible and can deform to conform to the space it is to seal. The seal (240) is also highly heat-resistant. Thus, the annular seal (240) advantageously provides an excellent seal between high temperature fuel cell components such as the housing (204), which may be made of steel, and the solid oxide fuel cell (202), which may be made with ceramic material. The annular seal (240) may also seal other interfaces of high temperature fuel cell system components. The embodiment of FIGS. 2a-2b is exemplary in nature.

Figure 3A:
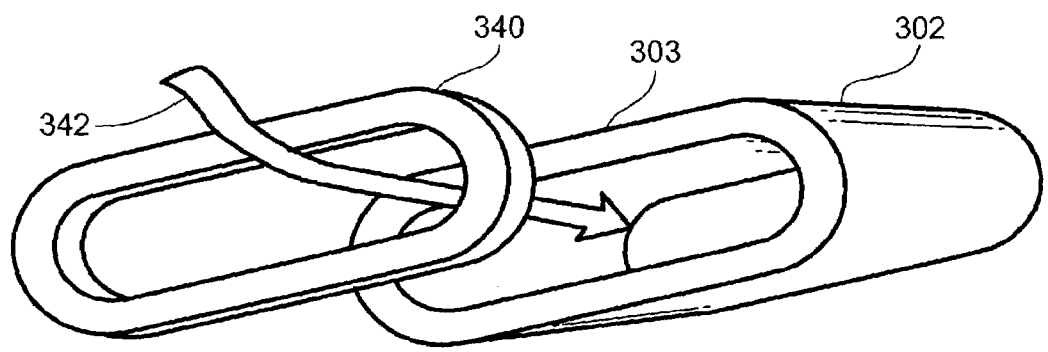
FIG. 3a is a perspective view of a flange gasket aerogel seal for use in a high temperature fuel cell system according to another embodiment of the present invention.
Figure 3B:
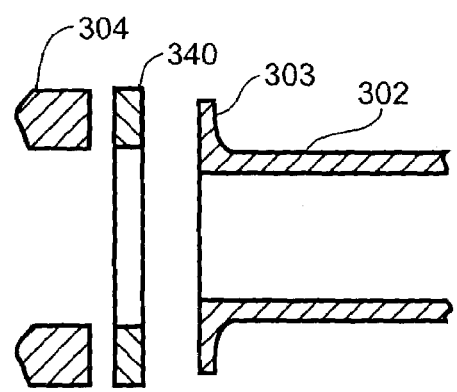
FIG. 3b is a cross-sectional view of the flange gasket aerogel seal of FIG. 3a in relation to a housing.

Turning next to FIGS. 3a and 3b, another aerogel seal configuration for a high temperature fuel cell system is shown. According to the embodiment of FIGS. 3a and 3b, the seal is a flange gasket (340) made with aerogel. The flange gasket (340) is disposed between a flattened solid oxide fuel cell tube (302) and a housing (304, FIG. 3b) for a high temperature fuel cell system. The flattened solid oxide fuel tube (302) includes a flanged end (303). The flange gasket (340) made with aerogel advantageously seals the interface between the housing (304) of a high temperature fuel cell system and the flanged end (303) of the flattened solid oxide fuel cell tube (302). The compliant, heat-resistant aerogel material included in the flange gasket (340) is highly effective even between generally incompatible material sets, such as a stainless steel housing and a ceramic solid oxide fuel cell tube.

Fuel and other reactants may pass through the flange gasket (340) and the into the flattened solid oxide fuel cell tube (302) as represented by an arrow (342). It will be appreciated that the flange gasket (340) may be shaped in many different configurations including, but limited to: circular, elliptical, and polygonal, and is not restricted to the shape shown. The flange gasket (340) may be formed into any shape, to seal any interface found in high temperature fuel cell systems.

Figure 4A:
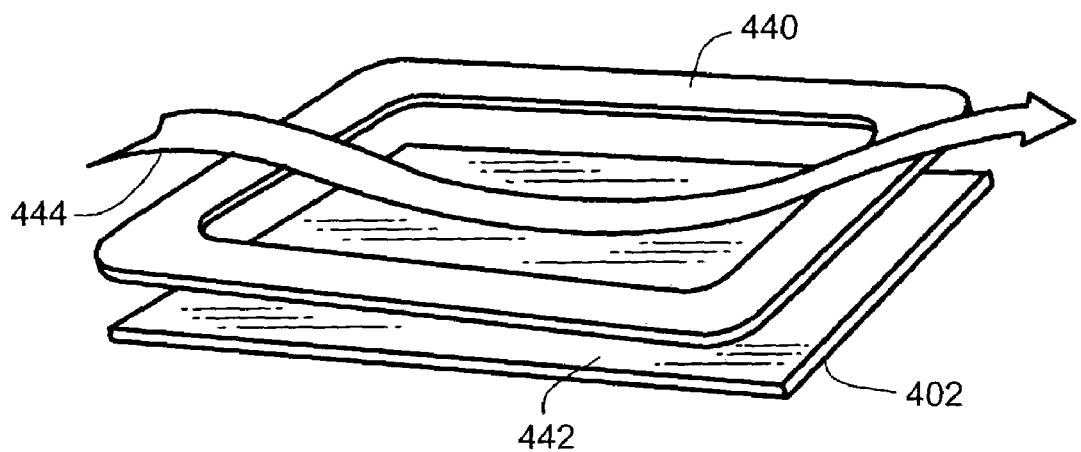
FIG. 4a is a perspective view of a perimeter gasket aerogel seal for use in a high temperature fuel cell system according to another embodiment of the present invention.
Figure 4B:
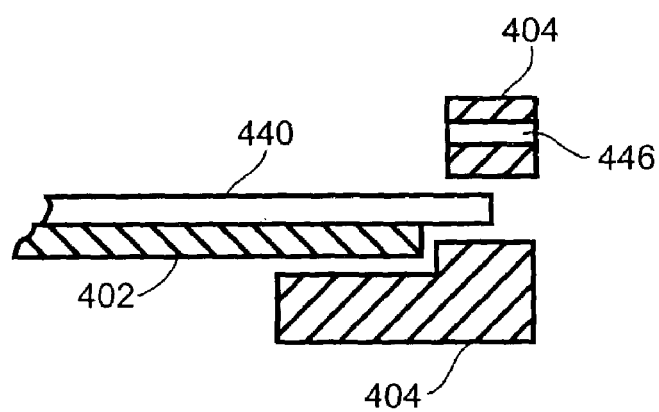
FIG. 4b is a cross-sectional view of the perimeter gasket aerogel seal of FIG. 4 in relation to a housing.

Turning next to FIGS. 4a and 4b, another aerogel seal configuration for a high temperature fuel cell system is shown. According to the embodiment of FIGS. 4a and 4b, the seal is a perimeter gasket (440) made with aerogel. The perimeter gasket (440) is arranged about a perimeter (442) of a planar high temperature fuel cell (402). The perimeter gasket (440) may be sandwiched between the planar high temperature fuel cell (402) and a housing (404, FIG. 4b). Alternatively or in addition to an arrangement between the fuel cell (402) and the housing (404), the perimeter gasket (440) may be used between multiple planar high temperature fuel cells (402) in a stack.

An arrow (444) represents a fuel flow path for fuel cell reactants used to generate an electric current. The flow of fuel, air (oxygen) or exhaust may enter or exit the housing (404) through one or more ports (446) in the housing (404).

Figure 5:
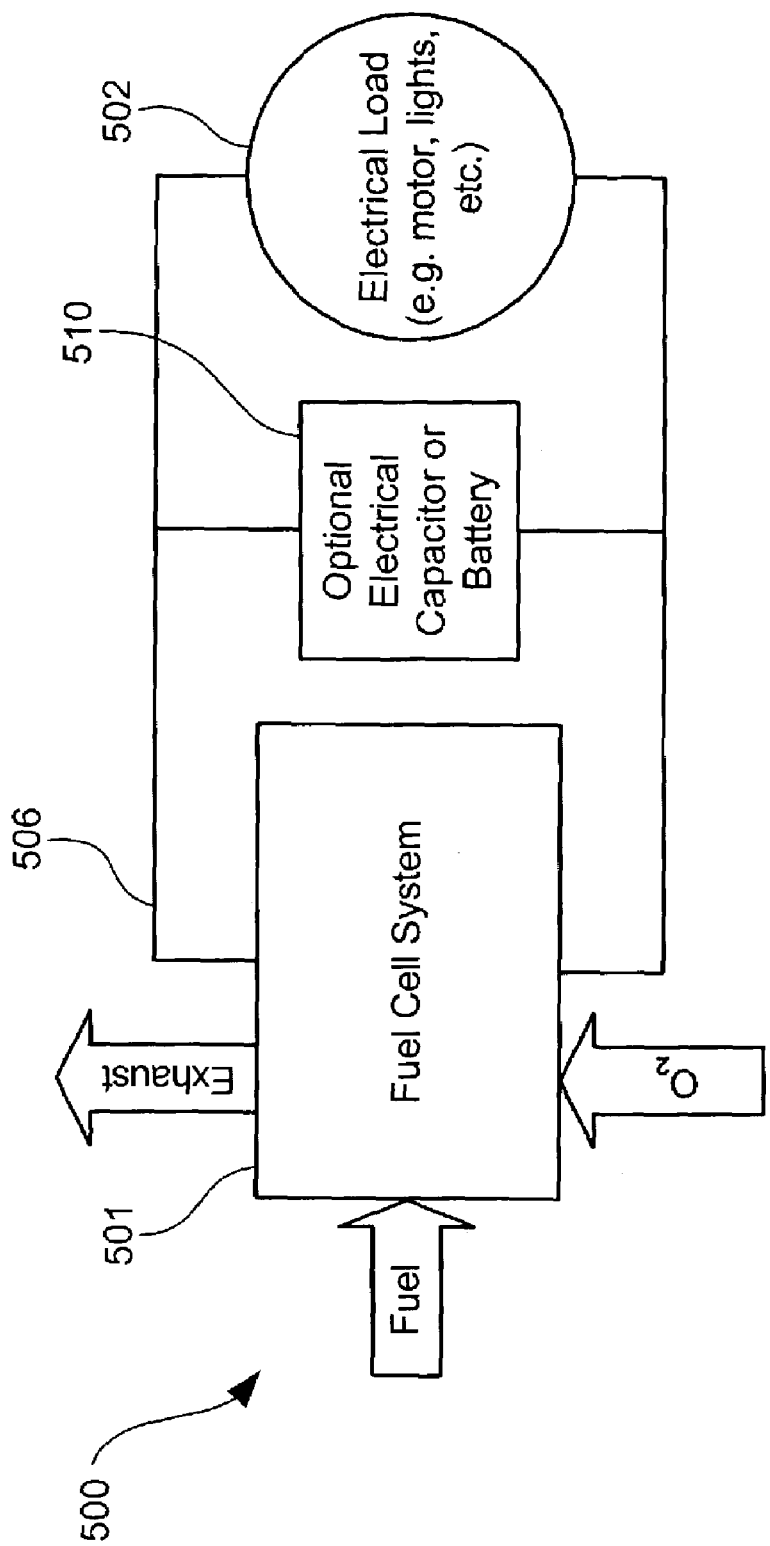
FIG. 5 is a diagrammatical view of an electronic device with which embodiments of the present invention may be used.

Turning next to FIG. 5, an electronic device (500) is shown. This device (500) includes a fuel cell system as a power source. The fuel cell system preferably incorporates one or more embodiments of the present invention to provide a seal between fuel cell system components.

FIG. 5 illustrates an electronic device (500) using a high temperature fuel cell system such as the one described above with reference to FIG. 1. According to the embodiment of FIG. 5, a high temperature fuel cell system (501) is in electrical communication with an electrical load (502). The high temperature fuel cell system (501) includes one or more aerogel seals between any two components, such as the components described above with reference to FIGS. 1-4b.

The high temperature fuel cell system (501) may provide power via a circuit (506) to the electrical load (502). The electrical load (502) may include any electrically operated device including, but not limited to: an automobile motor (and other automotive electronics), a light, a home auxiliary power unit, a computer, or other devices that run on electricity. The current consuming circuit (506) may also be connected to an optional electrical capacitor or battery (510), which is shown in electrical parallel with the high temperature fuel cell system (501). The electrical capacitor or battery (510) may provide auxiliary power to the electrical load (502).

The preceding description has been presented only to illustrate and describe the invention. It is not intended to be exhaustive or to limit the invention to any precise form disclosed. Many modifications and variations are possible in light of the above teaching. It is intended that the scope of the invention be defined by the following claims.

What is claimed is:

1. A fuel cell system comprising:
   a high temperature fuel cell contained in a housing;
   a fuel intake for providing fuel to said fuel cell;
   an oxygen intake for providing oxygen to said fuel cell;
   an exhaust path for exhaust from said fuel cell; and
   a first aerogel seal disposed between said fuel cell and said housing.

2. The system of claim 1, further comprising aerogel seals. disposed between said housing and either said fuel intake, oxygen intake or exhaust path.

3. The system of claim 1, further comprising aerogel seals disposed between said housing and each of said fuel intake, oxygen intake or exhaust path.

4. The system of claim 1, further comprising aerogel seals disposed at said fuel intake, oxygen intake or exhaust path.

5. The system of claim 1, wherein said aerogel seal is made from aerogel that was pulverized and reconstituted.

6. The system of claim 1, wherein said seal seals an anode chamber within said housing.

7. The system of claim 6, wherein said seal prevents fuel from escaping said anode chamber to intermingle with an oxidant in a cathode chamber within said housing.

8. The system of claim 1, further comprising a second aerogel seal providing a seal between said housing and electrical interconnections running from said fuel cell to an exterior of said housing.

9. The system of claim 1, wherein said fuel cell has a cylindrical shape and said first aerogel seal comprises an annular gasket disposed around said cylindrical fuel cell.

10. The system of claim 1, further comprising a flange gasket comprising aerogel.

11. The system of claim 10, wherein said flange gasket is disposed around a said intake or exhaust path of said housing.

12. The system of claim 1, wherein said first aerogel seal comprises a perimeter gasket comprising aerogel.

13. A fuel cell system comprising:
   a high temperature fuel cell contained in a housing;
   a fuel intake extending through said housing for providing fuel to said fuel cell;
   an oxygen intake extending through said housing for providing oxygen to said fuel cell;
   an exhaust path extending through said housing for exhausting exhaust from said fuel cell; and
   a seal comprising aerogel disposed between components of said system within said housing.

* * * * *